Figure 1:
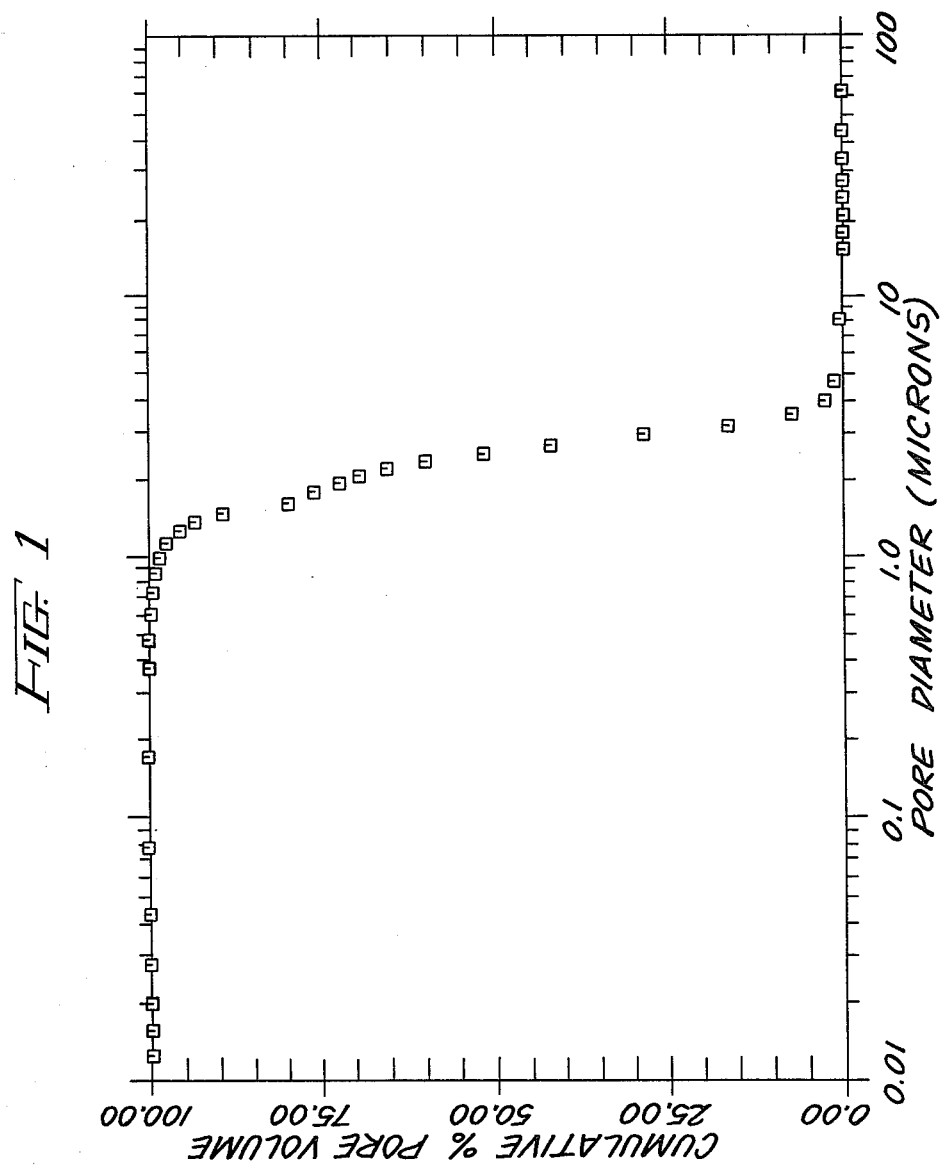

United States Patent [19]

Iacovangelo

[11] Patent Number: 4,460,495
[45] Date of Patent: Jul. 17, 1984

[54] CATHODE FOR MOLTEN CARBONATE FUEL CELL

[75] Inventor: Charles D. Iacovangelo, Schenectady, N.Y.

[73] Assignee: General Electric Company, Schenectady, N.Y.

[21] Appl. No.: 416,449

[22] Filed: Sep. 10, 1982

[51] Int. Cl.³ .............................................. H01B 1/06
[52] U.S. Cl. ..................................... 252/518; 252/519; 252/182.1; 264/61; 264/65; 264/66; 429/16; 429/45; 429/223
[58] Field of Search .................. 252/518, 519, 182.1; 429/16, 44, 45, 46, 220, 223; 29/25, 17, 623.1; 313/346 B; 75/200, 206, 211, 212, 214, 222, 224; 264/56, 61, 63, 65, 66; 423/592, 593, 641, DIG. 12; 427/215, 217

[56] References Cited

U.S. PATENT DOCUMENTS

| 4,176,170 | 11/1979 | Kasper et al. | 252/518 |
| 4,308,299 | 12/1981 | Arendt | 429/45 |
| 4,322,317 | 3/1982 | Rao et al. | 252/518 |
| 4,386,040 | 5/1983 | Baumgartner et al. | 75/206 |
| 4,390,460 | 6/1983 | Mujauchi et al. | 252/518 |

Primary Examiner—Josephine Barr
Attorney, Agent, or Firm—Jane M. Binkowski; James C. Davis, Jr.; James Magee, Jr.

[57] ABSTRACT

A compact comprised of a mixture of lithiated nickel oxide powder and lithiated copper oxide powder is fired in air producing a sintered body useful as a cathode in a molten carbonate fuel cell.

10 Claims, 2 Drawing Figures

CATHODE FOR MOLTEN CARBONATE FUEL CELL

The present invention relates to the production of a sintered body useful as a cathode in a molten carbonate fuel cell. The present cathode requirement appears to be a median pore size in excess of about 1 to 2 microns, and preferably, a median pore size of about 4–6 microns, and a total porosity of about 60+% by volume of the total volume of the cathode. However, in some cases, cathodes with a total porosity as low as about 50% by volume have been operable in molten carbonate fuel cells.

The state-of-the-art cathode in molten carbonate fuel cells is prepared by in situ oxidation of a porous nickel plaque. Under fuel cell operating conditions (650° C. in the presence of a 62:38 mole % $Li_2CO_3$:$K_2CO_3$ electrolyte), the nickel is oxidized to NiO containing approximately 2 cation % $Li^+$ substituted for $Ni^{+2}$ (i.e. to form $Li_{0.02}Ni_{0.98}O$). Oxidation is accompanied by a large volume expansion, considerably altering the initial porosity characteristics of the porous nickel. As electrolyte is redistributed from the electrolyte-supporting matrix which separates the anode from the cathode to the cathode in accordance with their relative pore size distributions, control of the actual electrode pore size distribution is important. The state-of-the-art cathode is generally 60–70% by volume porous with an approximately 3 to 4 micron mean pore size.

However, this in situ process of producing this state-of-the-art cathode creates a very fragile cathode with poorly controlled pore size distribution resulting in decreased performance. Also, on cooling the cell from operating temperature to about room temperature, this in situ formed cathode ordinarily fractures making it useless and, therefore, it is not useful for the operation of a fuel cell which has to undergo thermocycling.

The present invention overcomes the disadvantages of the prior art by producing a cathode prior to its incorporation in a molten carbonate fuel cell, and the present cathode does not change significantly in volume under fuel cell operating conditions. Specifically, the present method produces a cathode with controlled $Li^{\oplus}$ content, pore size and structural integrity. In attempting to fire a compact of lithiated nickel oxide powder alone in air to produce a cathode, it was found that extremely high sintering temperatures were required to produce any bonding at all, of the order of about 1500° C., which resulted in a rapid loss of lithium, and the fired piece was too brittle and too weak to be useful as a cathode in a molten carbonate fuel cell. Also, the firing of a compact of lithiated copper oxide powder alone in air required sintering temperatures of the order of about 1100° C. and resulting in a rapid loss of lithium and also producing a structure too brittle and weak to be useful as a cathode in a molten carbonate fuel cell.

In accordance with the present invention, the sintering characteristics of either powder is dramatically altered by utilizing a mixture of lithiated nickel oxide and lithiated copper oxide powders. Specifically, a compact of these mixed powders is sintered into a porous plaque at temperatures low enough to avoid lithium loss producing a sintered body with adequate structural resiliency for use as a cathode in a molten carbonate fuel cell.

Briefly stated, the present invention is directed to the production of a sintered body useful as a cathode in a molten carbonate fuel cell, said sintered body being composed of from about 10 weight % to about 90 weight % of $Li_xNi_{(1-x)}O$/balance $Li_yCu_{(1-y)}O$ where x and y each ranges from about 0.005 to about 0.25, which comprises providing a mixture of about 10 weight % to about 90 weight % of said $Li_xNi_{(1-x)}O$/balance said $Li_yCu_{(1-y)}O$, said mixture having an average particle size ranging from about 1.5$\mu$ to about 10$\mu$, forming said mixture into a compact, and firing said compact in air at a temperature ranging from about 600° C. to about 1000° C. producing said sintered body, said sintered body having a porosity ranging from about 25% by volume to about 75% by volume of the total volume of said sintered body.

As used herein, $Li_xNi_{(1-x)}O$ actually denotes $Li_x^+Ni_{(1-2x)}^{++}Ni_x^{+++}O$ and $Li_yCu_{(1-y)}O$ actually denotes $Li_y^+Cu_{(1-2y)}^{++}Cu_y^{+++}O$, where x and y each ranges from about 0.005 to about 0.25.

Figure 2:
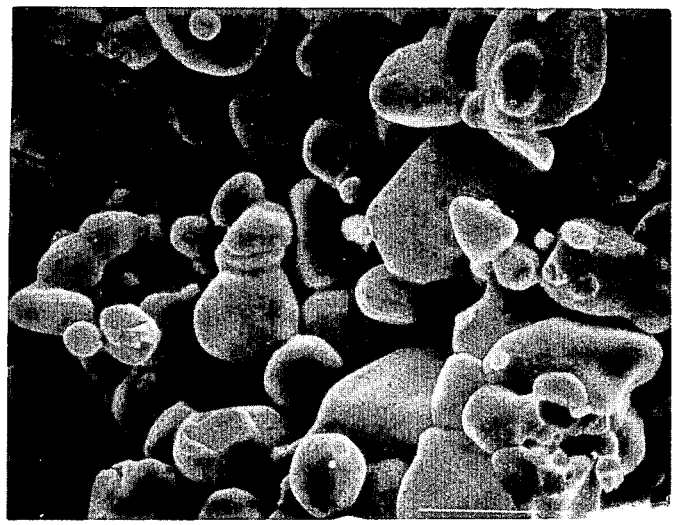
Figure 3:
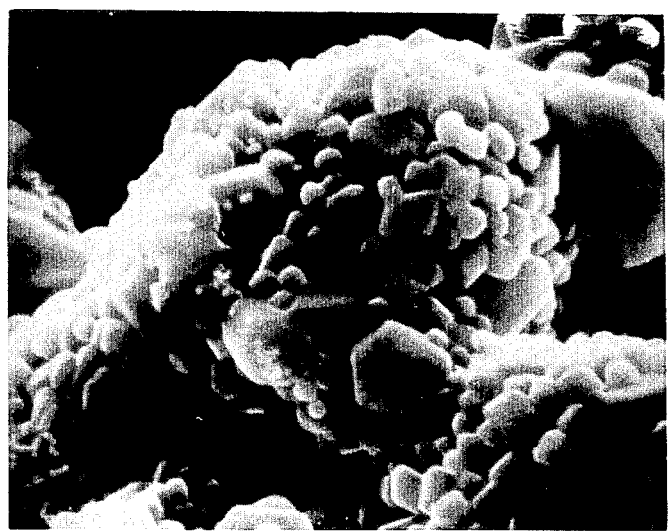

Those skilled in the art will gain a further and better understanding of the present invention from the detailed description set forth below, considered in conjunction with the figures accompanying and forming a part of the specification, where:

FIG. 1 is a graph on a logarithmic scale of the pore size distribution determined by mercury intrusion porosimetry for a sintered body useful as a cathode produced by the present process using a mixture of 50 wt % $Li_{0.02}Ni_{0.98}O$ and 50 wt % $Li_{0.01}Cu_{0.99}O$;

FIG. 2 is a scanning electron micrograph (magnified 2000X) of a sintered structure of the present invention composed of 50 wt % $Li_{0.02}Ni_{0.98}O$ and 50 wt % $Li_{0.01}Cu_{0.99}O$, the porosity of which is illustrated in FIG. 1; and FIG. 3 is a scanning electron micrograph (magnified 10,000X) of a state-of-the-art electrode which had been formed in situ in a molten carbonate fuel cell, i.e. it was formed by oxidation of the starting Ni electrode accompanied by lithiation of the oxidized electrode.

In the present process, $Li_xNi_{(1-x)}O$ powder and $Li_yCu_{(1-y)}O$ powder, where x and y each ranges from about 0.005 to about 0.25, is used. A value of x or y below about 0.005 results in a cathode of insufficient electronic conductivity to be useful in a molten carbonate fuel cell. On the other hand, the maximum value of x or y of about 0.25 is the maximum value of Li cation which can be incorporated or dissolved into the nickel oxide or copper oxide. Preferably, x and y each has a value of about 0.05 because that is close to the equilibrium value for operating conditions of the fuel cell.

The present $Li_xNi_{(1-x)}O$ powder and $Li_yCu_{(1-y)}O$ powder can be produced by a number of techniques. Preferably, the $Li_xNi_{(1-x)}O$ powder is produced according to the method set forth in U.S. Pat. No. 4,308,299 for "Lithiated Nickel Oxide" to Arendt, assigned to the assignee hereof, and incorporated herein by reference.

U.S. Pat. No. 4,308,299 discloses a process for producing lithiated nickel oxide powder of approximately predetermined $Li^{\oplus}$ cation content which comprises providing particulate NiO in a predetermined amount or precursor therefor, providing a source of $Li^{\oplus}$ cation in a predetermined amount, providing an alkali chloride salt selected from the group consisting of sodium chloride, potassium chloride and mixtures thereof, forming a mixture of said NiO or precursor therefor, said source of $Li^{\oplus}$ cation and said chloride salt solvent, heating said mixture to a reaction temperature at least sufficient to melt said chloride salt, dissolving in said molten solvent the source of $Li^{\oplus}$ cation and a portion of the NiO particles, said precursor decomposing completely at or below said reaction temperature to produce said NiO particles and by-product gas, said source of Li⊕ cation being dissolvable in said molten chloride solvent to produce Li⊕ cation and by-product gas, reacting the dissolved NiO and Li⊕ cation in said molten solvent precipitating the resulting lithiated nickel oxide onto the undissolved NiO particles forming an adherent black encapsulating coating thereon, said molten chloride solvent being maintained at a reaction temperature lower than the temperature at which said lithiated nickel oxide melts, said alkali chloride solvent being present in an amount at least sufficient to carry out said reaction, and recovering the coated NiO particles by dissolving said chloride salt and separating said coated NiO particles from the resulting salt solution. Preferably, the source of Li⊕ cation is selected from the group consisting of $Li_2O$, $LiNO_3$, $LiOH$, $Li_2CO_3$ and $Li_2SO_4$.

Preferably, the present $Li_yCu_{(1-y)}O$ powder is prepared according to the disclosure of U.S. Pat. No. 4,308,299 except that copper oxide would be used instead of nickel oxide.

The present particulate mixture is comprised of from about 10 wt % to about 90 wt % $Li_xNi_{(1-x)}O$/balance $Li_yCu_{(1-y)}O$. For best results, the mixture is comprised of from about 45 wt % to about 55 wt %, and most preferably 50 wt %, $Li_xNi_{(1-x)}O$/balance $Li_yCu_{(1-y)}O$. A mixture containing less than about 10 weight % $Li_xNi_{(1-x)}O$ is likely to produce an insufficiently sintered structure too weak and fragile to be useful as a cathode. On the other hand, a mixture containing more than about 90 weight % of $Li_xNi_{(1-x)}O$ is likely to require a firing temperature higher than about 1000° C. causing significant loss of lithium resulting in a structure with insufficient conductivity and also too brittle and too weakly bonded to be useful.

In the present process, the size, or size distribution, of the powders can vary and depends on the final porosity and mean size desired in the sintered structure, i.e. the present cathode. Specifically, the final porosity and median pore size of the present cathode are variable by choosing $Li_xNi_{(1-x)}O$ or $Li_yCu_{(1-y)}O$ powder of different sizes. Generally, in the present process, the average size or size distribution of these powders ranges from about 1.5 microns to about 10 microns, and preferably, it ranges from about 2 microns to about 7 microns.

The $Li_xNi_{(1-x)}O$ and $Li_yCu_{(1-y)}O$ powders are admixed to produce at least a substantially homogeneous mixture, i.e. dispersion, of the two powders. The mixing operation and any medium used to promote mixing of the present powders should have no significant deleterious effect thereon. The resulting mixture or dispersion can then be formed into a compact of desired shape and size by a number of techniques. Preferably, the mixture is deposited on an appropriate supporting substrate, for example alumina ceramic in the form of a layer or plaque, i.e. a piece with flat faces. Several approaches to mixing the powders and forming the mixture into a structure or compact of desired size and shape prior to sintering are possible. One approach is to suspend the two powders in an appropriate liquid medium such as water, and then filter the suspension into the desired size and thickness. The deposited mixture is then sintered at the desired firing temperature and time to form the present porous sintered plaque or cathode. A second technique is to roll mill the two powders for an adequate time to insure good blending. The mixture is then doctor bladed into the desired size and thickness and sintered to form the present porous plaque. Preferably, the deposited mixture of powders is pressed at room temperature to increase its density as desired. Also, preferably, the deposited mixture of powders is sintered between suitable plates, such as for example alumina ceramic plates. The top plate provides a minor but sufficient pressure, usually less than 1 psi, which prevents formation of voids, i.e. excessively large pores, during sintering. The specific thickness and density of the unsintered compact depends largely on the desired structure of the sintered body, i.e. cathode.

The unsintered compact is fired in air at or about atmospheric pressure at a temperature ranging from about 600° C. to about 1000° C. At temperatures below about 600° C. there is insufficient bonding between the particles to produce a sintered structure with sufficient mechanical strength to be useful as a cathode in a molten carbonate fuel cell. At temperatures higher than about 1000° C., loss of lithium occurs producing a structure with insufficient conductivity to be useful as a cathode in a molten carbonate fuel cell. For best results, the compact is fired at a temperature ranging from about 800° C. to about 900° C., and at such firing temperature range, firing usually is completed in from about 30 minutes to about two hours. The present firing or sintering has no significant effect on the composition of the present sintered cathode. Specifically, the present sintered cathode does not differ significantly in composition from that of the powder which was compacted and fired to produce it.

The present porous sintered body is self-supporting and it is useful as a cathode in a molten carbonate fuel cell. Usually, the cathode is in the form of a flat plate with flat faces, i.e. a plaque. The present sintered body or cathode has a total pore volume ranging from about 25% by volume to about 75% by volume of the total volume of the cathode. Preferably, the present cathode has a pore volume of about 40% of the total volume of the cathode, since such porosity provides the cathode with good surface area for electrochemical reactions of the cathode and allows the cathode to have good density necessary for strength.

The specific pore volume and pore size or pore size distribution of the present cathode is determinable empirically and depends largely on the porosity of the matrix supporting the carbonate electrolyte as well as the operating conditions of the cell. For best results, the cathode should have a pore volume and pore size distribution which allow enough electrolyte to enter it to accomplish reaction but not so much as to "flood" it to the point where the reacting gas cannot diffuse rapidly to its reaction sites. Small pores in the cathode or matrix for the electrolyte retain electrolyte in preference to large pores. In order for the cathode to perform well, it must take up enough electrolyte to allow the cell reaction; yet it must not take up so much electrolyte that the gas cannot diffuse rapidly to and from the reaction sites. Preferably, therefore, the cathode should have some percentage of pores which are smaller than pores in the matrix for the electrolyte to retain electrolyte and a larger percentage of pores which are greater than pores in the matrix for the electrolyte so as to remain dry. Generally, the median pore size of the present cathode ranges from in excess of one micron to about 10 microns, and preferably its median pore size is from about 3 microns to about 6 microns. Also, generally, the pores in the present cathode range in size from about 0.1 micron to about 20 microns, and frequently they range from about 2 microns to about 10 microns. The present sintered body, preferably ranging in thickness from about 0.01 inch to about 0.1 inch, and preferably in the form of a plaque or plate of uniform or substantially uniform thickness with flat faces, is particularly useful as a cathode in a molten carbonate fuel cell.

The present cathode is electrochemically active for the reactions of the molten carbonate fuel cell. Generally, the operating temperatures of a molten carbonate fuel cell range from about 500° C. to about 800° C. At the cathode, oxygen and carbon dioxide react to form carbonate via the overall reaction:

$$\tfrac{1}{2}O_2 + CO_2 + 2e^- = CO_3^=.$$

At the anode, hydrogen in the fuel gas reacts with carbonate ions from the electrolyte to form water and carbon dioxide:

$$H_2 + CO_3^= = H_2O + CO_2 + 2e^-.$$

The invention is further illustrated by the following examples:

EXAMPLES 1-6

Each powder in the powder composition of Table I was produced and retrieved according to the disclosure set forth in U.S. Pat. No. 4,308,299. Specifically, a molten salt medium comprised of 50 mole % KCl and 50 mole % NaCl was used. There was no significant loss of reactants in the reaction to produce the lithiated nickel or copper oxide. LiOH was reacted with nickel oxide (NiO), each in the appropriate amount, to produce the lithiated nickel oxide given in Table I. Also, LiOH was reacted with copper oxide (CuO), each in the appropriate amount, to produce the lithiated copper oxide given in Table I. Reaction temperatures ranged from 700° C. to 1100° C. and reaction time to produce each given powder was two hours.

The unsintered compact of each example in Table I was produced by suspending the powder in water, vacuum casting, i.e. filtering, the suspension as a substantially uniform layer on filter paper, covering the deposited layer with a filter paper, placing the resulting structure between a pair of paper towels, and pressing the resulting sandwich structure at room temperature under a pressure of about 1000 psi for about 2 minutes.

One filter paper was peeled away from the resulting compact which was then transferred to a supporting alumina plate, and the second filter paper then peeled away therefrom. An alumina plate was placed on top of the compact covering it, and the resulting sandwich structure was fired in air at atmospheric pressure as given in Table I. The top alumina plate exerted a pressure of less than about 1 psi and was used to maintain the flatness of the layer as well as to prevent formation of voids.

In Table I, the equivalent particle diameter size of Examples 1, 2 and 5 was determined from BET surface measurement of the powder.

Also, in Table I, median pore size of the sintered product was determined by means of mercury intrusion porosimetry.

TABLE I

| Examples | Powder Composition | Preparation of Powder Temp | Preparation of Powder Time | Equivalent Particle Diameter (μ) | Firing Temp (°C.) | Firing Time (hrs) | Sintered Product Size (inches) | Sintered Product Median Pore Size (μ) | Sintered Product Porosity % by vol. of Product |
|---|---|---|---|---|---|---|---|---|---|
| 1 | 50 wt % Li$_{.05}$Ni$_{.95}$O | 1100 | 2 hrs | 4.1 | 900 | 2 | 1.5 × 1.5 × 0.041 | 1.89 | 30 |
|   | 50 wt % Li$_{.01}$Cu$_{.99}$O | 700 | 2 hrs | 1.36 | | | | | |
| 2 | 50 wt % Li$_{.02}$Ni$_{.98}$O | 700 | 2 hrs | 2.0 | 900 | 2 | 1.5 × 1.5 × 0.050 | 2.55 | 48 |
|   | 50 wt % Li$_{.01}$Cu$_{.99}$O | 700 | 2 hrs | 1.36 | | | | | |
| 3 | 90 wt % Li$_{.05}$Cu$_{.95}$O | 800 | 2 hrs | ~5 | 800 | 1 | 5 × 5 × 0.024 | 2.0 | 29 |
|   | 10 wt % Li$_{.05}$Ni$_{.95}$O | 1100 | 2 hrs | ~4 | | | | | |
| 4 | 90 wt % Li$_{.05}$Ni$_{.95}$O | 1100 | 2 hrs | ~4 | 800 | 1 | 5 × 5 × 0.024 | 1.0 | 33 |
|   | 10 wt % Li$_{.05}$Cu$_{.95}$O | 800 | 2 hrs | ~5 | | | | | |
| 5 | 100 wt % Li$_{.05}$Ni$_{.95}$O | 700 | 2 hrs | 0.8 | 1400 | 1 | — | — | — |
| 6 | 100 wt % Li$_{.01}$Cu$_{.99}$O | 800 | 2 hrs | ~5 | 1100 | 2 | — | — | — |

Examples 1–4 of Table I illustrate the present invention. The sintered product of Examples 1–4 was black in color indicating no significant loss of lithium ion. Specifically, the sintered product of Examples 1 and 2 was a strong, well bonded, self-supporting structure which would be useful as a cathode in a molten carbonate fuel cell. The sintered product of Examples 3 and 4 was a well-bonded and self-supporting structure which, however, was not quite as strong as that of Examples 1 or 2, but which would still be useful as a cathode in a molten carbonate fuel cell. The sintered product of Example 5 was green in color indicating loss of lithium ion, extremely friable, not self supporting and would not be useful as a cathode in a molten carbonate fuel cell. The sintered product of Example 6 was black in color, but it was extremely friable, not self supporting and would not be useful as a cathode in a molten carbonate fuel cell. It is believed that the product of Example 6 had undergone significant loss of lithium ion since past experiments carried out in substantially the same manner as Example 6 showed substantial loss of lithium ion.

The sintered product of Example 2 is shown in FIG. 2. A comparison of FIG. 2 with the in situ formed state-of-the-art cathode illustrated in FIG. 3 shows the substantial difference in microstructure between the two cathodes.

Analysis by mercury intrusion porosimetry of the sintered structure of Example 2 is shown in FIG. 1. Specifically, FIG. 1 shows a pore size range from about 1 micron to about 4 microns with a median pore size of about 2.55 microns.

The sintered product of Examples 1–4 was in the form of a plaque, i.e. a plate of uniform or substantial uniform thickness, having a pair of flat or substantially flat faces.

In copending application, Ser. No. 416,448 filed on even date herewith for C. D. Iacovangelo, entitled CATHODE COMPOSITE FOR MOLTEN CARBONATE FUEL CELL, assigned to the assignee hereof and incorporated herein by reference, there is disclosed a cathode composite useful for a molten carbonate fuel cell comprised of a porous sintered cathode having a porous sintered bubble pressure barrier integrally sintered to one face thereof covering said face and being coextensive therewith, said cathode composite having a pore volume ranging from about 25% by volume to about 75% by volume of the total volume of said composite, said cathode having a pore volume ranging from about 25% by volume to about 75% by volume of the total volume of said cathode, said pressure barrier having a pore volume ranging from about 25% by volume to about 75% by volume of the total volume of said barrier, said cathode having a median pore size ranging from in excess of one micron to about 10 microns, said barrier having a median pore size significantly smaller than that of said cathode, said cathode and said pressure barrier being comprised of from about 10 weight % to about 90 weight % $Li_xNi_{(1-x)}O$-balance $Li_yCu_{(1-y)}O$, where x and y each ranges from about 0.005 to about 0.25.

What is claimed is:

1. A process for producing a sintered body useful as a cathode in a molten carbonate fuel cell, said sintered body being composed of from about 10 weight % to about 90 weight % of $Li_xNi_{(1-x)}O$/balance $Li_yCu_{(1-y)}O$, where x and y each ranges from about 0.005 to about 0.25, which comprises providing a mixture of about 10 weight % to about 90 weight % of said $Li_xNi_{(1-x)}O$/balance said $Li_yCu_{(1-y)}O$, said mixture having an average particle size ranging from about 1.5μ to about 10μ, forming said mixture into a compact and firing said compact in air at a temperature ranging from about 600° C. to about 1000° C. producing said sintered body, said body having a porosity ranging from about 25% by volume to about 75% by volume of the total volume of said sintered body.

2. The process according to claim 1 wherein said firing temperature is about 800° C.

3. The process according to claim 1 wherein x and y each has a value of about 0.02.

4. The process according to claim 1 wherein said sintered body is in the form of a plaque or plate with flat faces.

5. The process according to claim 1 wherein said mixture is comprised of from about 45 weight % to about 55 weight % of said $Li_xNi_{(1-x)}O$/balance $Li_yCu_{(1-y)}O$.

6. A sintered body useful as a cathode in a molten carbonate fuel cell, said sintered body being composed of from about 10 weight % to about 90 weight % of $Li_xNi_{(1-x)}O$/balance $Li_yCu_{(1-y)}O$, where x and y each ranges from about 0.005 to about 0.25, said sintered body having a porosity ranging from about 25% by volume to about 75% by volume of the total volume of said sintered body, said sintered body having a median pore size ranging from in excess of 1 micron to about 10 microns.

7. The sintered body of claim 6 wherein x and y each has a value of about 0.02.

8. The sintered body of claim 6 wherein said porosity is about 40% by volume.

9. The sintered body of claim 6 composed of about 45 weight % to about 55 weight % of said $Li_xNi_{(1-x)}O$/balance $Li_yCu_{(1-y)}O$.

10. The sintered body of claim 6 in the form of a plaque.

* * * * *